…

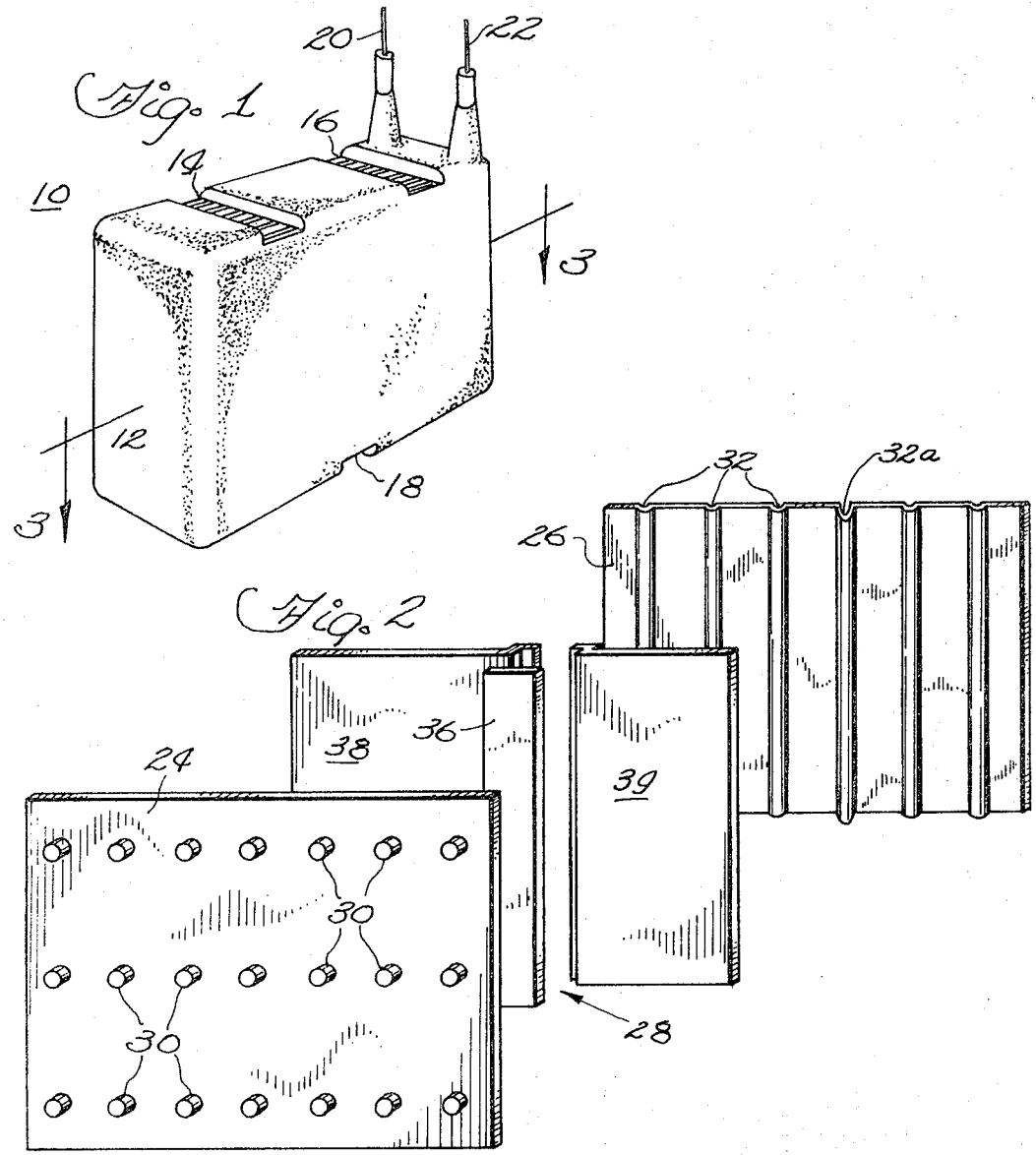

3,306,775
CELL PARTITION FOR BATTERIES
Leonard J. Burant, Milwaukee, Kenneth R. Jones, Mequon, and Donald R. Wolter, Brown Deer, Wis., assignors to Globe-Union Inc., Milwaukee, Wis., a corporation of Delaware
Filed Oct. 16, 1963, Ser. No. 316,664
7 Claims. (Cl. 136—90)

This invention relates to batteries, and more particularly to deferred action batteries employing a plurality of cells which are separated from each other by impervious partitions.

In Jones et al. application Serial No. 287,171 filed May 29, 1963 for Deferred Action Cells, the battery there described is made up of a plurality of subassemblies, each including an anode of a given cell, a cathode for the next adjacent cell, and an impervious partition disposed intermediate the anode and cathode to separate, electrochemically isolate, and electrically interconnect adjacent battery cells. As heretofore known, the partition took the form of a piece of silver foil welded at selected points to the anode on one side thereof and in intimate electrical contact with the cathode on the other side thereof.

The use of silver foil as the separator was dictated by a desiderata of electrochemical inertness with respect to the cathode, fluid isolation, and good electrical conductivity. However, the use of silver foil for the partition constitutes a significant cost factor in the ultimate battery. One object of the present invention is to provide an improved battery construction in which an improved intercell partition is employed to electrochemically isolate adjacent cells while providing low resistance interconnection therebetween.

Another object of the present invention is to reduce the cost of the battery by constructing the partition, at least in part, of a less costly material, without increasing the intercell resistance within the battery.

A further object of the present invention is to provide a deferred action battery construction and method of manufacture therefor by which a deferred action battery may be more economically manufactured without harming its electrical characteristics.

Another object of the invention is to provide an intercell partition in a battery which is adhesively secured to one of the electrodes thereof over a substantial proportion of its area.

These and other objects and advantages of the present invention will become manifest from an examination of this specification, and the accompanying claims and drawings.

In one embodiment of the present invention, a deferred action battery is made up of a plurality of subassemblies each including an anode electrode, a cathode electrode, and an impervious partition interposed therebetween. The partition is an integrated assembly of a piece of conductive foil and a web of impervious insulating material adhesively secured to the edges of the conductive foil, the piece of foil and web of insulation together forming a continuous impervious partition, electrochemically inactive in association with the electrode materials and providing an intercell conductive path. In the preferred embodiment, used in conjunction with a silver chloride-magnesium battery, the piece of foil is silver and is spot welded to the magnesium anode. The web is an adhesively coated thin plastic film. The cathode is provided with a protuberance disposed adjacent the piece of foil to insure improved electrical contact therewith.

Reference will now be made to the accompanying drawings in which:

FIG. 1 is a perspective view of a deferred action battery incorporating the present invention;

FIG. 2 is an exploded view of one of the subassemblies of the battery of FIG. 1; and FIG. 3 is a partial cross sectional view taken along the line 3—3 of FIG. 1.

Referring now to FIG. 1 of the drawings, there is illustrated a perspective view of a deferred action battery 10 constructed in accordance with the present invention. The battery 10 comprises an outer casing 12 formed of thermoplastic material or the like which assists in holding the internal elements of the battery in position with respect to each other, provides the necessary isolation of the cells for battery action, and also provides protection for the internal elements of the battery against damage due to outside mechanical forces. Within the battery 10, a plurality of cells are located in side-by-side relationship with spacing for electrolyte between the respective anodes and cathodes. At the top and bottom of the battery, lateral passageways are provided to distribute the electrolyte uniformly over the active areas of each electrode and throughout each cell. The internal construction of one such battery is shown in detail in application Serial No. 287,171.

The particular battery illustrated in FIG. 1 is of the type which employs water, and particularly salt water as an electrolyte. The battery is energized by immersing it in sea water or the like whereupon the electrolyte enters the interstices through a plurality of ports 14, 16 and 18. The ports 14 and 16 are spaced apart in the top of the battery while the port 18 is located in the mid portion of the bottom of the battery as illustrated in FIG. 1. The ports 14, 16 and 18 and the provision of internal communicating passageways insures the free entry of the electrolyte into the interstices of the battery. Any arrangement of ports which insures good electrolyte distribution may be employed.

A pair of electrical leads 20 and 22 extend outwardly through the wall of the casing 12, and may be connected to an electrical apparatus to be powered by the battery.

The battery illustrated in FIG. 1 is made up of a plurality of subassemblies, one of which is illustrated in exploded form in FIG. 2. Each of the subassemblies includes an anode electrode 24, a cathode electrode 26 and a partition 28 disposed intermediate the anode and cathode electrodes. In the particular embodiment described, the battery is intended for use with salt water as an electrolyte, the anode 24 is preferably composed of magnesium, and the cathode 26 is preferably composed of silver chloride. A plurality of spacers 30 are attached to one surface of the anode electrode 24 and serve to separate the anode and cathode electrodes within each cell when the subassemblies are assembled into a completed battery.

The spacers 30 may be cut from a plastic sheet or formed of any suitable electrical insulator. Each subassembly comprises the anode 24 of one cell and the cathode 26 of the next adjacent cell, with the partition 28 therebetween. The partition 28 serves several important purposes. It is necessary that the partition 28 be impervious to the electrolyte used in the battery to avoid electrolytic action between the anode 24 and cathode 26 of adjacent cells which form a part of the subassembly and are separated only by partition 28. The partition 28 also serves as an internal electrical connection between adjacent cells of the battery so that the voltages of adjacent cells are added in series. The number of subassemblies which are employed to make up a completed battery depends upon the final battery voltage which is desired.

The cathode electrode 26 is formed with a number of parallel grooves or channels 32 substantially equally spaced over the electrode area. The grooves 32 are positioned in the cathode 26 so that they serve as spacers to maintain the cathode 26 spaced from the partition 28 in the subassembly. The various uses and advantages of the channels 32 are set forth in application Serial No. 287,171.

The partition 28 is formed of a piece of conductive material such as a strip 36 of conductive silver foil and a web of insulating material, such as the web portions 38 and 39. The strip 36 in the preferred embodiment is oriented parallel to the grooves 32, and opposite a groove 32a which is slightly deeper than any of the remaining grooves 32. The enlargement of the channel 32a is exaggerated in FIG. 2 for clarity. In practice, the groove 32a may be in the order of .005" deeper than the remaining grooves 32. One edge of each of the sheets 38 and 39 overlaps the conductive foil 36 to form a fluid seal. The sheets 38 and 39 are preferably thin films of a plastic such as polyethylene terephthalate resins (Mylar) and may be provided with a pressure-sensitive adhesive 41 on the side facing the anode 24 such that they will readily adhere to the edges of the silver film and to the anode 24 and be supported thereby. The conductive foil 36 is in electrical contact with both the anode 24 and the larger channel 32a of the cathode 26. The electrical connection between the foil 36 and the anode 24 is preferably formed by spot welding the foil 36 to the anode 24, while the electrical connection between the foil 36 and the cathode 26 is formed by intimate contact between the foil and the convex surface of the channel 32a. It will be appreciated that any other means of maintaining contact between the foil and the silver chloride cathode is not essential during the early portion of the battery life since the contact between the foil 36 and the channel 32a is insured by the force with which the subassemblies are urged together when the battery is assembled. Each of the cathodes 26 is somewhat, although imperceptibly, bowed by this force about the enlarged channel, and is sufficiently resilient to tend to straighten and thereby urge the larger groove 32a against the foil 36 in intimate electrical contact. It will be recognized that silver chloride is an extremely poor conductor of electricity. Consequently, before assembly of the batteries, the silver chloride is slightly reduced chemically to form a very thin film of porous silver on the surface. It is this thin silver film which initially completes the electrical circuit to the silver strip 36.

As illustrated in FIG. 3, when the battery is made up of a plurality of cells, the positions of the larger channels 32a are staggered to provide the most compact assembly and to equalize the effect of the slight size difference. The relationship of the various elements of the battery is ensured by the casing 12 which is molded around the assembled components as taught in application Serial No. 287,171.

It has been found that by the use of the partition 28 in combination with an aligned larger channel 32a of the cathode 26, an electrical connection is effected which is equivalent to the case where the entire partition 28 is constructed of silver foil and the convex surfaces of each of the grooves 32 bear on the partition. It is theorized that this is because of the force with which each of the cathodes 26 bear against the foil 36, in response to the bowed form of the cathodes.

Many variations of the basic structure disclosed herein will immediately occur to one skilled in the art. For example, while a polyethylene terephthalate sheet with an adhesive layer thereon for adhesive sealing engagement with the anode surface and with the edge of the conductive foil is used, other materials might be employed. Sheets of other film materials such as vinyl polymers and copolymers with adhesive coatings and preferably pressure-sensitive adhesive coatings may be employed. A thermally bonded material could also be used requiring the use of heat-sealing equipment. Also, one may employ a plastic dissolved in a solvent to cover and adhere to both the anode and the conductive strip. This embodiment requires more complex processing techniques and equipment but will produce a practical result.

Although the illustrated embodiment is provided with an elongated aperture or window in the impervious material 38, it should be obvious that other shapes of openings are also possible to provide for different shapes of protuberances projecting from the cathode 26. If a square opening is provided, for example, the protuberance interconnecting the cathode 26 and the partition 28 might be square in shape, and the insulating material 38 may be a single sheet with a window therein to accommodate the protuberance.

The foregoing will so fully and completely described the invention as to permit others, by applying current knowledge, to modify and adapt the same for use under varying conditions of service without departing from the essential features of novelty which are intended to be defined and secured by the appending claims.

What is claimed is:

1. In a deferred action battery having a plurality of cells, each with a sheet-like anode electrode, a sheet-like cathode electrode and spacer means therebetween to provide a reactive space, a liquid impervious partition separating adjacent ones of said cells, said partition completely separating said electrodes of adjacent cells and including a web of electrically conductive foil covering a minor area of said electrodes and an electrically nonconductive material covering a major area of said electrodes, said nonconductive material having edge portions overlapping adjacent edge portions of said foil and being sealed thereto along said adjacent edges and said foil being in electrical contact with the cathode electrode of one cell and the anode electrode of an adjacent cell.

2. The deferred action battery of claim 1 wherein said electrodes and said partition are generally planar and stacked in overlying relationship to form said battery.

3. The deferred action battery of claim 2 wherein a casing is disposed around said electrodes and partition and engages the peripheral portions of said partition in a liquid impervious relationship.

4. The deferred action battery of claim 1 wherein one of said electrodes has a protuberant portion extending outwardly from the general plane thereof and in overlying relationship with said foil, said protuberant portion being in compressive and electrically conductive relationship with said foil.

5. The deferred action battery of claim 1 wherein said foil is welded in electrically conductive relationship with said anode electrode.

6. The deferred action battery of claim 5 wherein said anode electrode is magnesium, said cathode electrode is silver chloride, and said conductive foil is silver.

7. The deferred action battery of claim 1 wherein said nonconductive material is a thin flexible synthetic plastic film having a pressure sensitive adhesive on one surface thereof, said pressure sensitive adhesive engaging said anode electrode and said edge portions of the foil in a sealed, liquid impervious relationship.

References Cited by the Examiner

UNITED STATES PATENTS

| | | | |
|---|---|---|---|
| 2,040,255 | 5/1936 | Gordon. | |
| 2,637,756 | 5/1953 | Coleman et al. | 136—112 X |
| 2,831,046 | 4/1958 | Linton | 136—175 |
| 2,988,587 | 6/1961 | Haring | 136—90 |
| 3,102,058 | 8/1963 | Jones | 136—90 |
| 3,178,316 | 3/1965 | Wilke | 136—112 X |

WINSTON A. DOUGLAS, *Primary Examiner.*

ALLEN B. CURTIS, D. L. WALTON,
*Assistant Examiners.*